United States Patent [19]

Grimsley et al.

[11] 4,437,794
[45] Mar. 20, 1984

[54] PYRAMIDAL OFFSHORE STRUCTURE

[75] Inventors: R. Leroy Grimsley; Len J. Gawel, both of Ponca City, Okla.

[73] Assignee: Conoco Inc., Ponca City, Okla.

[21] Appl. No.: 229,425

[22] Filed: Jan. 29, 1981

[51] Int. Cl.³ .............................................. B63B 35/44
[52] U.S. Cl. .................................... 405/224; 114/265; 405/195; 405/203; 405/210
[58] Field of Search ............... 405/203, 204, 205, 206, 405/207, 208, 224–227; 114/264, 265

[56] References Cited

U.S. PATENT DOCUMENTS

| | | | |
|---|---|---|---|
| 3,289,419 | 12/1966 | McGownen | 114/264 X |
| 3,540,396 | 11/1970 | Horton | 114/265 |
| 3,572,043 | 3/1971 | Clara | 114/264 X |
| 3,596,950 | 8/1971 | Wipkink | 405/207 X |
| 3,709,307 | 1/1973 | Clark | 114/264 X |
| 3,996,754 | 12/1976 | Lowery | 405/207 X |
| 4,100,754 | 7/1978 | Vogel | 405/205 |
| 4,106,302 | 8/1978 | Vogel | 405/205 |
| 4,117,691 | 10/1978 | Spray | 405/205 |
| 4,181,452 | 1/1980 | Pagezy et al. | 405/205 X |

FOREIGN PATENT DOCUMENTS 670511 4/1952 United Kingdom ............... 114/264

Primary Examiner—Dennis L. Taylor
Attorney, Agent, or Firm—Cortland R. Schupbach, Jr.

[57] ABSTRACT

Tethered or bottom-ballasted offshore platforms preferably have a pyramidal configuration. Struts connect the apexes of a polyhedron configuration to form a triangle defining each face. The pyramidal configuration can be ballasted to the bottom in relatively shallow water. A hexadron configuration can be tethered in deep water with tension members and flotation members.

16 Claims, 10 Drawing Figures

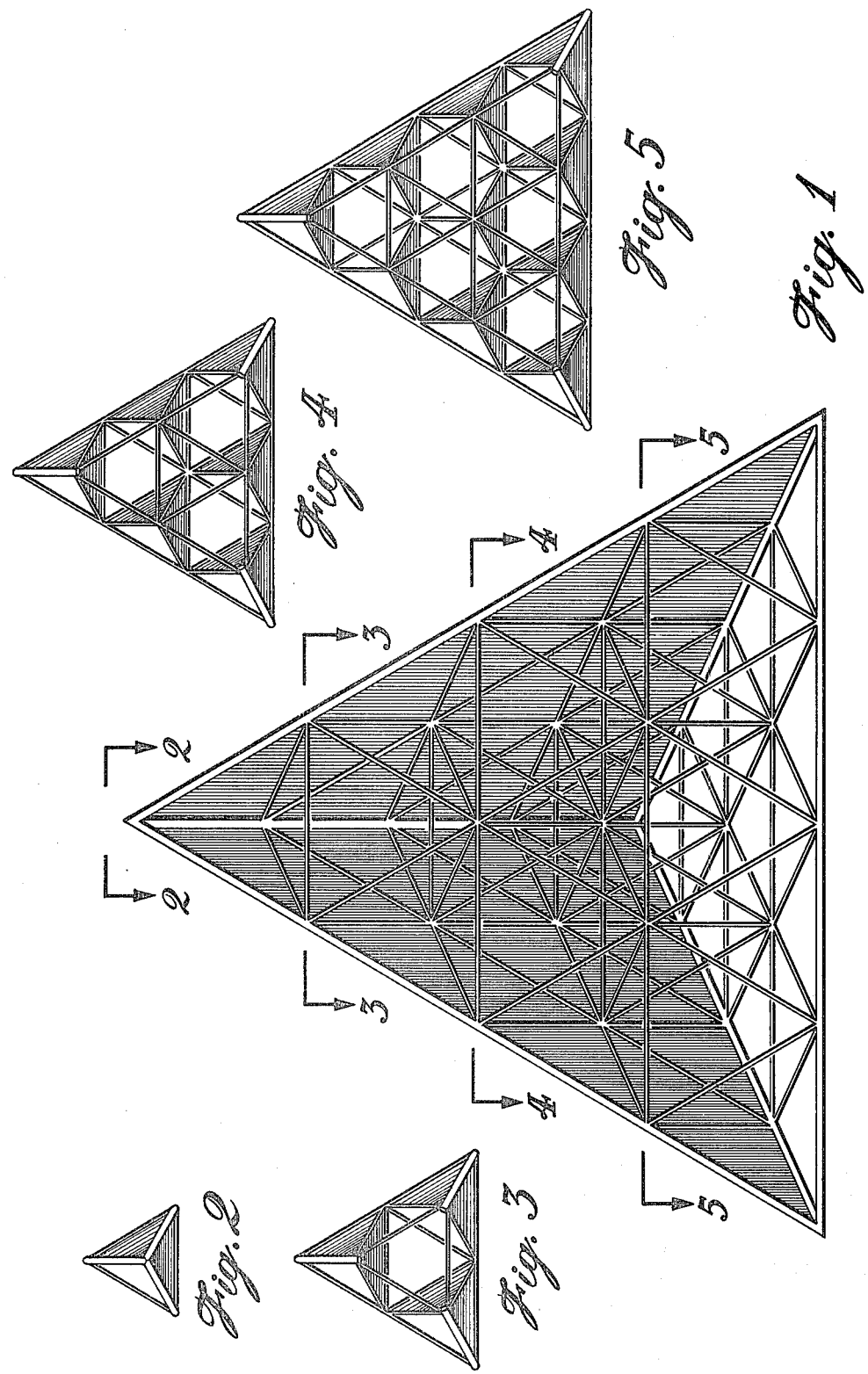

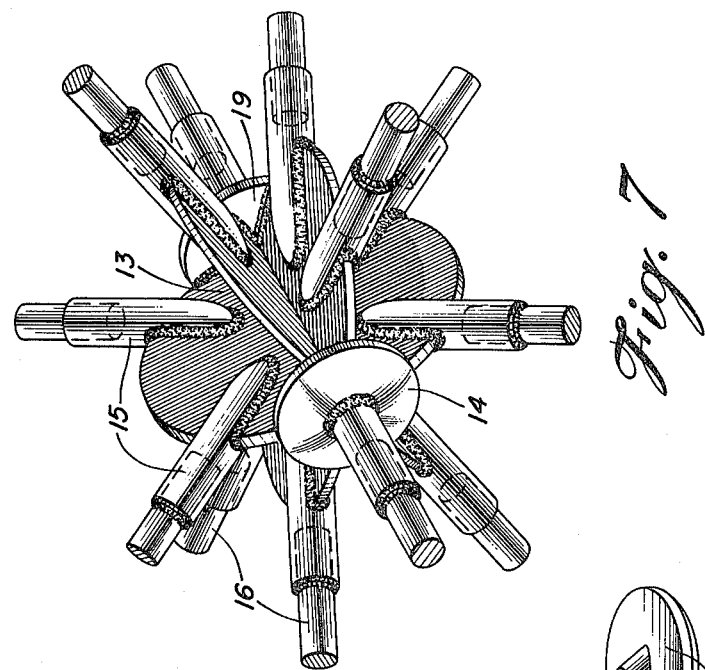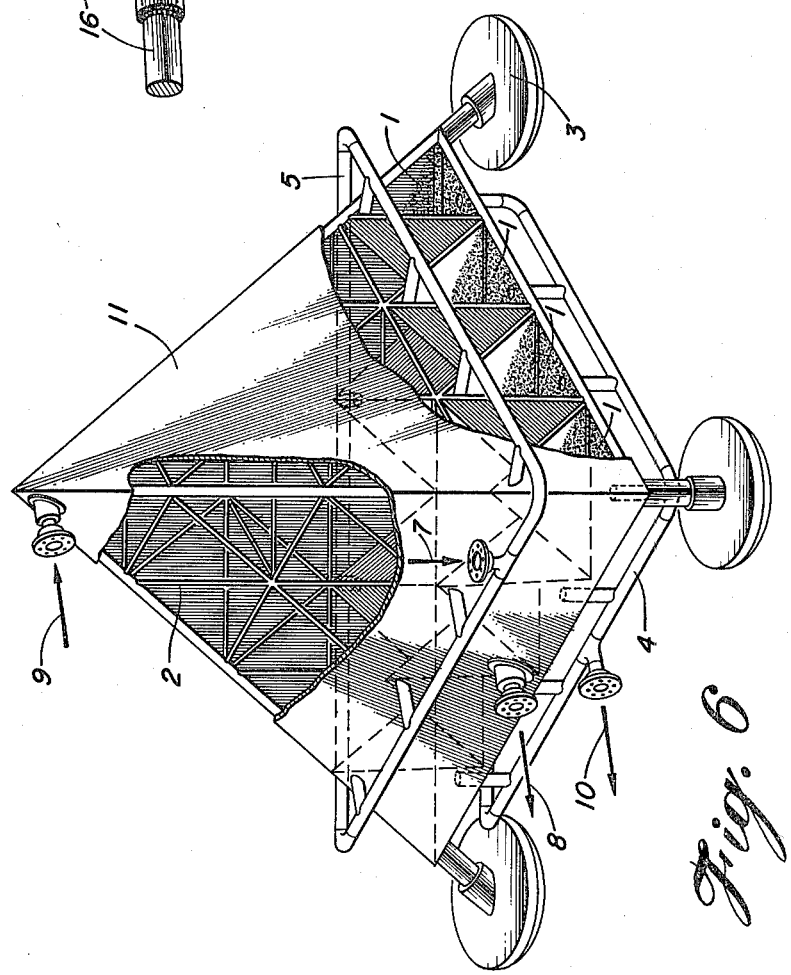

PYRAMIDAL OFFSHORE STRUCTURE

This invention relates to marine structures. In particular it relates to structures located or suitable for location over a fixed position on the bed of a body of water. More particularly, this invention relates to a platform suitable as a buoyant or floating type of platform or modified to a rigidly supported platform on the bed of the body of water. In addition, storage structures for underwater use offshore are provided.

Requirements of an ideal offshore platform such as would be used for offshore oil well drilling operations, radar stations, heliports, and the like indicate that such platforms should be relatively unaffected by tides, wave motion and by changes in the amount or distribution of the load. Such platforms should preferably be capable of being anchored in relatively deep water and being moved without difficulty from one location to another. In addition, in small or shallow bodies of water, such platforms should be in condition for alteration to operate in such shallow bodies of water.

Thus, these structures are divided into two broadly different categories, in accordance with whether they are supported wholly or partly by their own buoyancy. Any structure which is partially immersed in water undergoes a buoyancy force. However, such forces may or may not suffice to support the entire weight of the structure. When such buoyancy is insufficient to support the weight of the structure, the structure must necessarily rest on the bed of the body of water. Structures which float or are self-buoyant can be balanced by tension in the mooring lines or by a downward pull by some means attaching them to a seabed, such as by an anchor. These excess buoyancy structures are commonly referred to as tension leg platforms or structures and may have a working platform situated above the water surface by means of buoyancy chambers situated below the surface and from which supporting means extend upwardly to the working platform.

These structures have been considered as semi-submersible and have been used in the oil industry for exploration purposes. On such tension leg structures, the anchor lines must be arranged such that they will hold firmly and will not be easily displaced from the equilibrium position of the platform. These platforms are normally used in waters whose depths exceed 600 to 1000 feet. However, the construction and weight of such platforms becomes critical because of the necessary equipment which must be utilized and the resultant buoyancy of such platforms.

In addition, oil production from such platform, when far offshore, requires the presence of storage ships or lengthy pipelines in order to contain the produced oil. These problems are commonly encountered as oil production moves into waters which are deeper than those previously explored.

The art contains many examples of platforms which are suitable for drilling purposes. Among these are U.S. Pat Nos. 2,972,973; 4,169,424; 3,387,459; 2,187,871; 3,791,154; 2,653,451; 4,170,431; and 3,572,041. However, all of these previously disclosed ideas are relatively inflexible in application and require excessive production costs and/or add weight to the platform.

It would therefore be of great benefit to provide a platform design wherein stability and economy are excellent, wherein the platform is suitable for modification to operate in either shallow or deep water, and which provides a storage system for such platforms. Ideally, both platform and storage system can be easily moved from one location to another.

It is therefore an object of the present invention to provide structures which meet these criteria. These structures have novel design and excellent operating characteristics. It is also an object of this invention to provide underwater storage for hydrocarbons produced from such platforms. Other objects will become apparent to those skilled in this art as the description proceeds.

By the present invention we have provided an offshore support structure comprising a substantially level flotation adjustable center section formed from a geometric configuration containing at least three flotation adjustable members supporting at least three upper members, wherein said members substantially join to form an upper apex and having at least one substantially horizontal platform supported by said upper members. Normally, such a structure can be defined by triangular shapes. Preferably, the structure forms in essence a tetrahedron, which tetrahedron structure is used in shallow waters wherein at least a portion of the weight of structure can be supported by the bed of the body of water. However, for deeper water the substantially level flotation adjustable center section would contain in addition at least three lower members depending from said center section wherein the lower members would substantially join to form a lower apex. This lower apex would, in a preferred embodiment, likewise describe a hexahedron. Thus a dual pyramid structure would be formed. Normally the geometric configuration of any two adjacent upper members in the horizontal center section would be an isosceles triangle as would be the geometric configuration of any two adjacent lower members. Horizontal working platforms can be provided at any point desired, normally above water level, which includes levels both above and below the upper apex. In the lower section, a substantially rigid jack-leg can extend downward from the lower apex with a weight adjustable, depth adjustable balance moveably affixed thereto in order to minimize the pendulum effect of the platform.

In addition, we have provided a moveable underwater storage structure comprising an internally segmented tetrahedron and/or hexahedron self-supporting structure which has a fluid impermeable covering over an internally segmented skeleton. These structures can be subdivided internally, such that ballast of either water or sand slurry or the like can be utilized to counterbalance the voids provided by the internal structure covered by the impermeable covering. Normally, such structure intersection points would contain from three to twelve members depending upon the location within the structure. The structure can be compartmented as desired. In moving such undersea structures, normally only sufficient ballast is moved to counterbalance the weight of the structure, which then becomes free floating. The structure is then simply moved to the desired loaction and again counterflooded to seat the structure firmly upon the bed of the body of water.

In the present invention the terms "sea" or "marine" or "body of water" are used interchangeably to refer not only to seas and oceans proper, but also to lakes and other bodies of water. The term "marine" is used thus through the specification and claims in an analogous sense. The instant invention is applicable to both salt and fresh bodies of water.

The invention is more concretely described with reference to the figures.

GENERAL DESCRIPTION OF THE DRAWINGS

FIG. 1 is a description of an underwater storage chamber of the present invention showing the internal skeleton without the impermeable covering.

FIG. 2 is a cross-section of an upper segment as viewed from above.

FIG. 3 is a top view of the second level of the structure.

FIG. 4 is a top view of the third level of the structure.

FIG. 5 is a top view of the fourth level of the structure.

FIG. 6 is a partial cutaway, three dimensional view showing such a storage structure in operation.

FIG. 7 is a detail of the most complex joint of the internal skeleton of the structure.

DETAILED DESCRIPTION OF THE DRAWINGS

Figure 8:
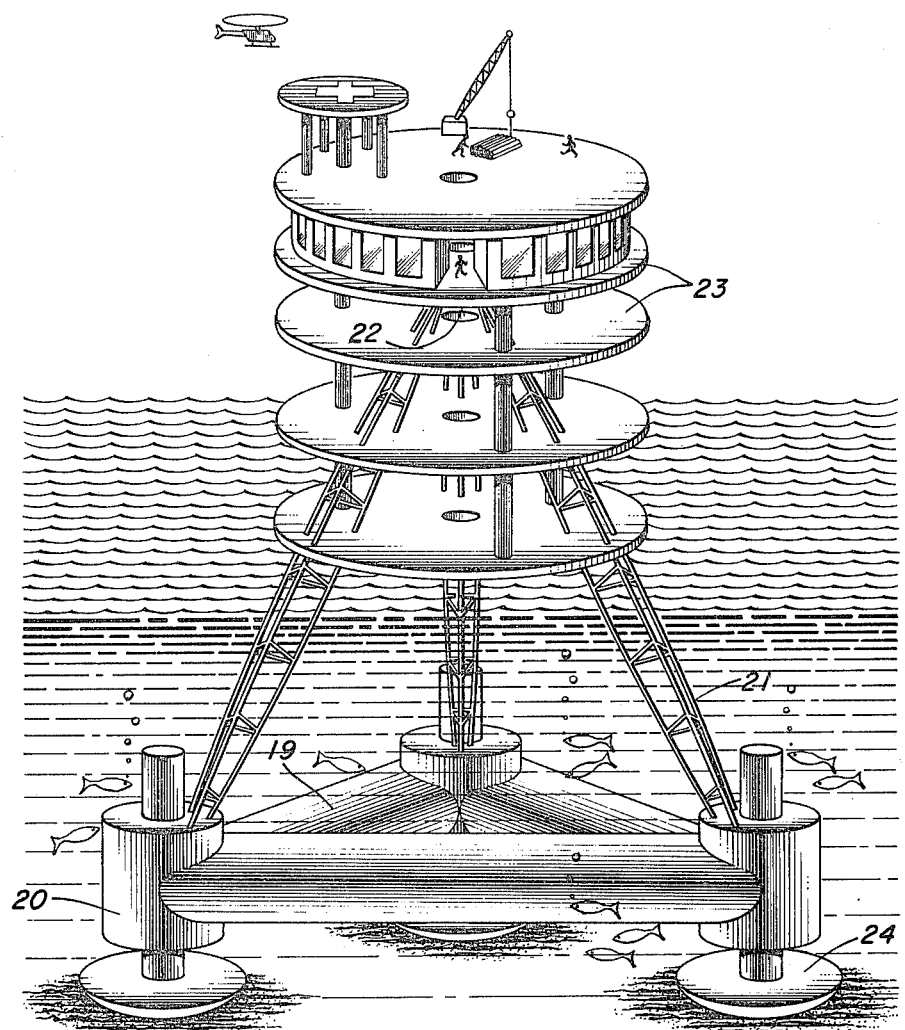
FIG. 8 is a perspective view of the offshore platform of the present invention in a shallow water mode.

FIG. 1 shows a basic pyramidal structure adaptable for production storage and the like in underwater applications. These structures are of large capacity and are segmented to prevent large pressure differences between the inside and the outside of the storage vessel. The pressure difference depends upon the specific gravity of the materials stored relative to sea water and the difference in the water depth from top to bottom of the vessel or in a closed segment of the vessel.

FIG. 1 shows a self-supporting pyramid structure composed of many small pyramids. All of the super-structure members in this structure are of equal length, allowing for ease of construction and uniformity of materials and parts. The storage structure is equal on all sides and looks the same no matter which side rests on the bottom of the ocean. However, in a practical sense it will normally be necessary to provide storage legs as well as interior walls to form the various internal compartments.

In the figures shown, 120 equal cyclindrical segments are combined. Of course, any length segments can be used, although the optimum length and diameter for the skeletal structure will be determined depending upon the use for which it is employed. However, these duplicate members are efficiently produced in a factory assemblyline manner. The intersect points consist of only three to twelve members.

Two types of cavities exist within the pyramid. In the model shown there are twenty small 4-sided pyramids (similar to the one at the top apex) distributed through the model. In addition, there are ten larger cavities distributed throughout the structure. The large cavities are enclosed by eight triangular plates. Each side is parallel to the opposite side. A top view of the superstructure of the enclosure shows a six-pointed star resulting from a top and bottom triangle out of phase 1/6 of a revolution.

FIG. 2 shows a cutaway view of the top layer of the pyramid illustrating the skeletal effect of the arrangement.

FIG. 3 shows a second level cutaway of the underwater storage structure showing both types of internal cavities.

FIG. 4 shows a third level cutaway of the underwater storage structure and illustrates in detail the multiplicity of cavities as the level increases.

FIG. 5 shows a final cutaway of the pyramidal structure showing the pyramidal cavities useful in the present invention.

In FIGS. 1 through 5 the small cavities occupy about 30% of the volume of the pyramid while the ten large cavities occupy about 70% of the volume of the pyramid. For example, if oil having a specific gravity of 0.75 with respect to sea water was stored in the cavity and silica sand was used as ballast (having a gravity of 2.0), then the average weight would be 114% of an equal volume of water or an effective downward force in water of 14% of the volume of water displaced. The weight of the super-structure (normally steel) and tank enclosures would add even more downward force to stabilize the structure. However, it should be realized that the skeletal structure is not limited to steel but can be comprised of hollow pipe, whether steel or polymer or other rigid means. The covering of the structure need only be fluid impermeable with respect to the water and the material being stored and would normally be selected from the group consisting of steel plate, polymer plate, film, fabric, and in some instances concrete.

FIG. 6 is a detailed cutaway view of an operating model of an underwater storage vessel. In the figure, chambers designated (1) are ballast chambers containing water, sea water, or sand slurry or the like, whereas the chambers designated (2) (which may or may not be compartmented) contain the material to be stored. In the illustration shown, support legs (3) are described, although on a smooth sea bottom such would not be necessary. A piping arrangement (4) is shown. For clarity and convenience said arrangement is mounted below the main body of the vessel. However, such could easily be mounted around the periphery of the vessel as is piping (5). In operation, counterflooding of the vessel for underwater storage is accomplished by passing sea water, sand slurry, or other ballast into the buoyancy chambers through line (7) until the structure rests on the bed of the body of water. During such operations contents of the storage chamber (2) are at least partially removed through line (8) to provide buoyancy until the desired location is reached. At that point, additional material is placed into the vessel through line (9) in order to lower the vessel to the bed of the body of water. Should the vessel be moved to another location, contents of the storage chamber (2) are simply removed through line (8) to provide a greater buoyancy. Then ballast chambers (1) are emptied through line (10) to provide a neutral or slightly positive buoyancy whereafter the vessel is towed to a new location and again affixed to the bottom.

The outer covering (11) can be composed of any suitable material which is impermeable to the contents of the vessel and the surrounding water, which is not affected by either, and has the necessary strength to withstand the pressure differences.

FIG. 7 is a detail of a preferred construction of the most complex joint in the underwater structure comprising twelve members at a common point. In the detail a central six disc arrangement (13) is firmly attached or capped by identical structures (14) and then attaching means (15) are firmly affixed thereto. Members comprising the internal arrangement of the vessel itself (16), all of equal length, are then affixed by any convenient means to provide the joint. Other less complex joints are well known to those skilled in the art and require no further illustration.

FIG. 8 is a detailed view of a shallow water mode of an offshore platform containing a substantially level flotation adjustable center section (19) formed from a geometric configuration containing at least three flotation adjustable members (20). In addition, the flotation adjustable center section (19) preferentially contains flotation chambers. The system contains at least three upper members (21) which substantially join to form an upper apex (22) having supported thereupon at least one substantially horizontal platform (23) which are supported by the upper members. The geometrical configuration of any two upper members (21) and the center section (19) is substantially an isosceles triangle. The center section (19) can contain any number of segments up to and including a circle, although a preferred embodiment would contain from three to six members. In the preferred embodiment adjustable legs (24) are contained in the apex points of the center section (19) to allow leveling the platform once on the bed of a body of water. The upper members (21) are preferably parabolic arcs formed of hollow pipe for weight savings, rigidity, and strength. These upper members meet at a common apex (22) which is then surrounded by horizontal platforms (23) which may be both above and below the apex. In the figures shown in the shallow water mode, the center horizontal members (19) and (20) are counterflooded to rest on the bed of the body of water and are supported by legs (24) which legs can be modified according to height to provide a substantially horizontal working platform.

Figure 9:
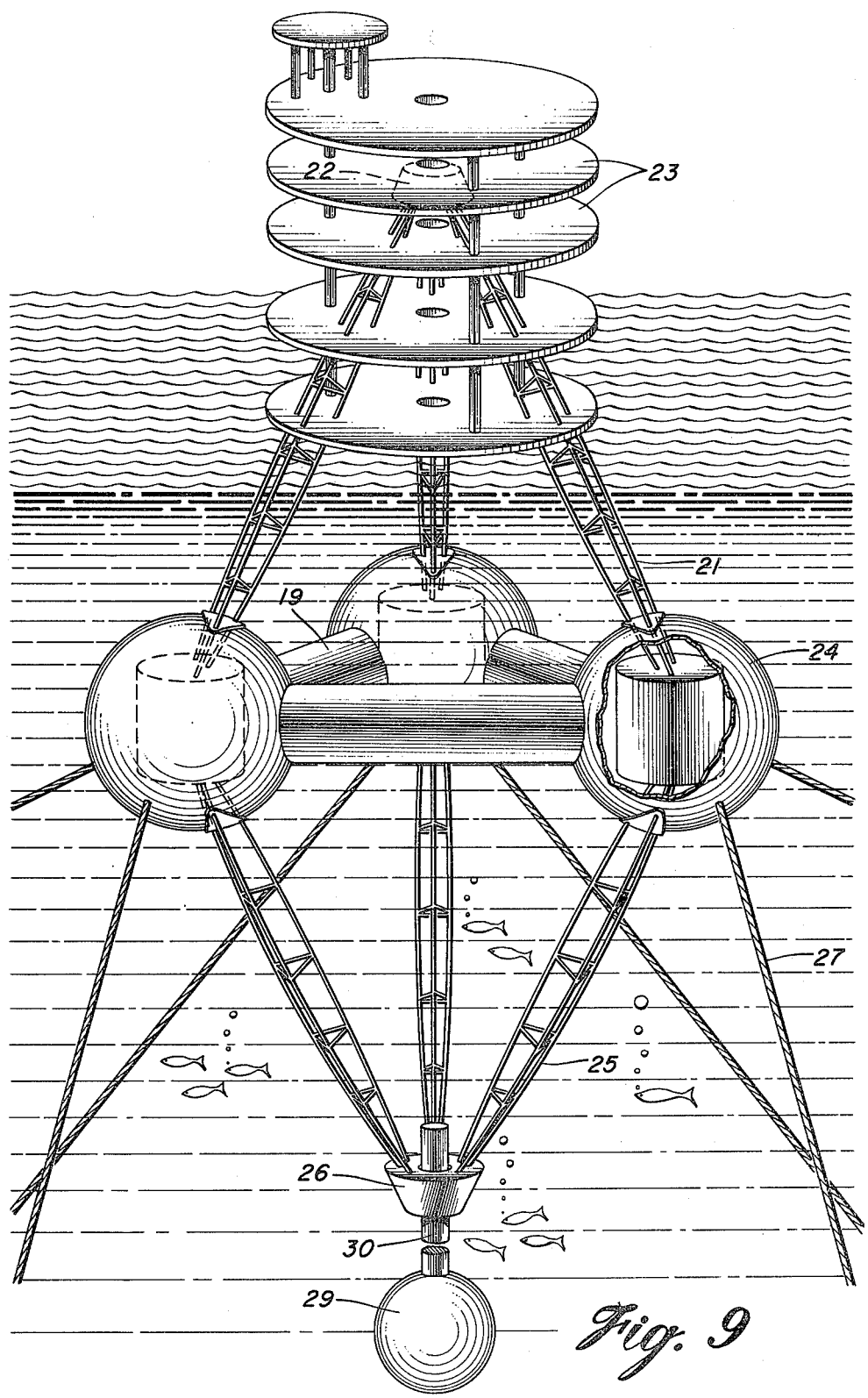
FIG. 9 is a perspective view of the offshore platform of the present invention in a deep water, tension-leg platform mode.

FIG. 9 describes the deep water or tension leg mode of the present invention. As before, the upper apex (22), horizontal platforms (23), upper members (21), and substantially level flotation adjustable center section (19) are similar to that of the shallow water mode. Additional additional flotation spheres (24) are illustrated which provide more flotation to support the additional weight of the lower members (25) which normally have substantially the same construction as the upper members (21). The lower members (25) can of course be covered to form buoyancy chambers if necessary or desired. Such chambers can comprise all or any part of said lower members. In addition, a lower apex (26) is included, which provides extreme rigidity and strength to the platform. The platform is moored by a desired number of anchor cables (27) which are fixed to the bed of the body of water by means well known to those skilled in this art. In particular, well known techniques for adjusting the tension of such anchor cables such as described in U.S. Pat. No. 4,169,424 are used to position and maintain the platform as desired.

Optionally, to increase the moment of inertia and to eliminate or greatly reduce platform sway and roll, a pendulum (29) is provided on an adjustable member (30). The pendulum's depth can be adjusted by simply raising or lowering it on member (30) to increase the moment of inertia. In addition, the weight in the pendulum can be adjusted by flooding with water or a pumpable water sand slurry or oil. Such a pendulum is preferably operable from the platform itself, usually by automatic control.

Figure 10:
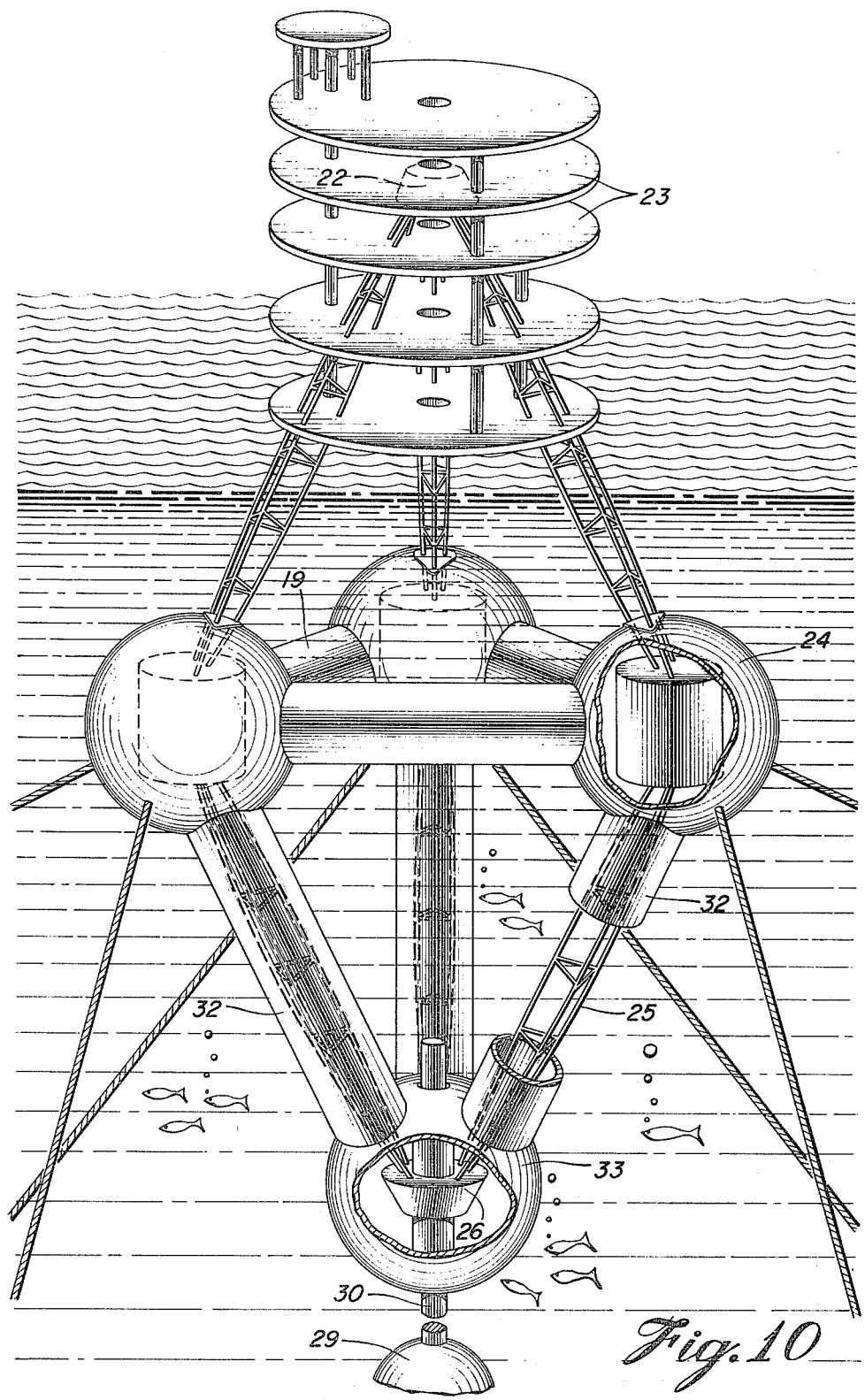
FIG. 10 is a perspective view of the offshore platform of the present invention wherein additional buoyancy is obtained.

FIG. 10 describes a platform similar to FIG. 9 except the lower members (25) are encased in flotation means (32). The lower apex (26) is likewise surrounded by a buoyancy chamber (33). The center section flotation spheres (24) and flotation adjustable center section (19) as well as the lower flotation members (32) and lower buoyancy chamber (33) need not have the internal lower members (25) for some applications. Such members increase the strength and rigidity of the platform, but add weight, such that buoyancy is decreased. Usually such additional weight is not critical unless horizontal platform (23) loads are extremely heavy.

The platform of the present invention normally will be tethered by at least one anchor point at the bottom apex. This would allow the platform to rotate, which may be acceptable in some applications, such as when used for oil storage. However, in most applications at least one anchor line at about a 45° angle would extend from each horizontal apex, with preferably two or more anchor lines extending from each horizontal intersect. Additional anchor lines can of course be used as desirable. Additional stability results when anchor lines are extended from the bottom apex to outlying anchor points.

In general, the construction and mooring features of the instant invention have many advantages over conventional structures. This structure is more stable due to the rigidity of structure and the extensive mooring system and location of flotation which is below major wave action. The pyramid is a strong basis structure comprised of a collection of triangles. In both the platform and the subsurface storage facility, this design has been extensively used. This pyramid design functions as a unit, rather than an assortment of units and components which attempt to combine several functions and physical principles. Thus, the functions of both a platform and a storage facility are met while maintaining high structural integrity.

In the platform, the three members extending downward from the top apex are under compression, while the three members extending down from the horizontal intersects are under tension. The three horizontal members are additionally under tension. The tension members can preferably be made from high strength steel which reduces the mass of the platform. Fatigue will not be a major problem with the platforms and storage structures of the present invention, since the primary members will see a minimum of alternating tension and compression forces which normally lead to fatigue failures.

The platform of the present invention is versatile in that it can be used for drilling, production, storage, radar observation and the like, or a combination of any of these operations. The stability characteristics of the platform will allow substantial savings in operations such as in drilling where in contrast a dynamically positioned drill ship is extremely expensive. Construction costs of the present platform are much less than convention platforms due to the duplication of components, since the primary construction components are very similar. Construction can be carried out in a shallow water port, or even on land where the components can be moved by rail if the platform is not of excessive size. This duplication allows factory, rather than custom, construction techniques. The platform allows a very favorable equipment-to-platform weight ratio, due to the more desirable location of the load bearing members. The adaptability of the platform allows construction of major components to be up to 75% complete before the platform is implanted at place of use.

Flotation at the three horizontal intersects allows a good degree of portability and reuse of the platform at more than one location. Since the platform functions as a unit and can be balanced, transportation and launching will be much less hazardous. Safety is greater with the platform of the present invention in both construction and use phases, due to component duplication. The structure utilizes a design which can better integrate work and safety features, and which is less affected by weather.

The platform can be transported to location using its own flotation rather than using a barge. Flotation to the launch site can involve two of the three flotation members in the structure. A travel position for the structure could involve one apex of the structure secured to a barge while the other apex remains out of water. Alternately, two flotation members could be submerged, but still support the weight of the structure. Both apexes would then rest on barges or a tow boat.

Launching the structure simply involves submerging two of the flotation members to reduce buoyancy, anchoring the bottom apex, and then adding buoyancy to the two submerged flotation members. This sequence aligns the structure in the desired upright position. The launch operation will be much less strenuous to the structure than conventional operations, where portions of platforms are ejected over the edge of a barge. In addition, the possibility of damage to support vessels is greatly reduced.

The platform can be anchored using conventional buried or driven piles which can be quickly implanted into the sea floor using equipment which is well known to those skilled in this art. There are wide range of materials and designs available to connect the platform structure to anchors implanted in the sea floor.

Steel in the form of wire rope, cable, chain links and the like stretch less than synthetic fibers and are preferred for platforms, anchors, cables and the like. However, steel has a specific gravity several times greater than water, and a mutual buoyancy system is necessary in some applications. Thus, for some applications synthetic fiber anchor cables will be used. A variety of synthetic fibers are available in several configurations. Representative examples of such fibers useful in anchoring the platform of the present invention are nylon, polyester, and polyaramids. Nylon stretches about 30% before weakening, and can be useful in some tension-leg applications. Polyaramids are probably the strongest synthetic and are an excellent choice in an inline configuration for anchor cable. Other considerations, such as mutual buoyancy over long cable spans, durability in a marine environment, ocean currents and the like, should also be considered in selecting anchor cables.

When used in a shallow water mode the bottom apex can rest on the sea floor as a load-bearing base and anchor lines can be placed, as in deep water modes. Anchor lines in such instances could, of course, attach above the surface of the water. The structure can also be fitted with a support leg at the bottom apex. In very shallow water, the top portion of the pyramid can be used alone. In this shallow water mode the platform can be equipped with leveling legs at the apexes to substantially level the flotation adjustable center section.

As illustrated in FIG. 9, stability can be increased by placing weight in the vicinity of the bottom apex. This is one option available to give the platform the necessary stability to meet conditions dictated by weather and water depth. When the weight is heavier than the above-water portion of the platform, the platform remains upright without anchor connections. When an enclosed container is securely attached to the platform in the vicinity of the bottom apex, this likewise gives a stabilizing affect. This container only requires the displacement of a volume of liquid which weighs about the same as above water equipment and the like. The latter arrangement, of course, depends on anchor lines to keep the structure in an upright position. The structure has essentially a neutral buoyancy.

Space, weight and cost savings are realized by planning the design and location of above water liquid storage tanks. Sloshing of liquids in tanks affects an offshore structure's natural flexible frequencies and dampening. The present pyramid design allows less fluid movement than conventional platforms. However, concentric storage tanks and internal baffles remain good methods to cope with tank problems. In addition, the lower apex, (29 in FIG. 9) can double as a storage member.

As in all platforms, placement of heavy equipment and supplies is important. Heavy equipment should be placed below the top apex where it can be supported to best advantage. Living quarters and other bulky necessities can be situated above the pyramid apex. Heavy materials such as drill pipe, etc. can be stored parallel to, below and even within the main jacket legs as joined at the apex.

Conventional drilling platforms have a derrick on the top deck. This arrangement is unnecessary with the platform of the present invention. The equivalent of a derrick can hang from the apex of the structure. In such an embodiment, the derrick is essentially a large enclosed cylinder opened at both ends. This arrangement of the present platform allows work to progress in an enclosure out of bad weather. The cylinder is built to have a length far longer than those in conventional derricks. This additional length allows multiple sections of downhole tubular material to be handled as one section, which lessens drill time, equipment and expense.

Many flotation options can be carried out using the present invention. Flotation can be situated along the horizontal members of the platform as well as at the apexes. Flotation can also be suspended from the bottom apex, such that the flotation device occupies a portion of the center section. Flotation can be positioned at or near the surface of the water. Additional flotation is not desirable under severe conditions, however, and should be avoided if possible.

A 60 thousand tonnes buoyancy platform using a triangular apex flotation system would require in addition cylindrical flotation members in the substantially level flotation adjustable center section. Such structures can easily be constructed using modern technology. When primary superstructure members have a length of 225 feet, apex spheres on the triangular center section will be 80 feet in diameter together with 60 foot diameter cylinders used on the horizontal members. This volume displaces about 60 thousand metric tons (tonnes) of water.

Alternately, flotation devices can be inserted in the pyramid formed by the lower apex and the center section. Yet another option is to construct an internal skeletal arrangement much as that described in FIGS. 1 through 5 describing the subsea storage. This arrangement is then inserted into the lower apex. This internal pyramidal structure can then be compartmented as desired. These compartments are flooded and evacuated as necessary to maintain buoyancy. In addition, such chambers are quite useful for storage. Such an arrangement would allow essentially the use of the entire lower apex as flotation whenever necessary, although of course in practice such flotation would not be necessary. Drilling strings from the platform would pass through such a structure in non-compartment areas.

In such an arrangement the center structure is the most logical location to store fluids recovered such as hydrocarbons. Recovered hydrocarbons in addition add buoyancy to the structure in almost all cases.

The design of the present platform and subsea storage area uses from one to three different diameters of tubular material. When three different diameters are used, the largest diameter normally is used for the outside edges, while the intermediate diameter normally would be used for the outside faces. The smallest diameter material normally would be used within the structure. Duplicate construction components allow assembly line construction and assembly. Progressive construction can occur on any face of the structure, or all faces simultaneously. For example, as in the manufacture of the subsea storage area, construction can be limited to ground level and each successive level raised as it is completed. This technique increases construction safety and allows different layering as the structure is built up (FIGS. 2 through 5). As described, FIG. 7 shows a mode for connecting the structure components which converge on a single point. The number of components converging are three, six, nine or twelve, depending on the location within the structure. With reference to FIG. 6, tetrahedron cavities facing downward can be used both as flotation and anti-buoyancy chambers. When used as a subsea storage structure, such cavities can then be used for flotation needed to transport the structure to site. A heavier than water slurry can be used to counteract the buoyancy of oil once the structure is in use. Air can be injected into inlets (10) or (7) and fill the flotation cavity. When used in the lower apex of the pyramidal offshore structure, the same arrangement as in the subsea platform can be used, except the skeleton inverted such that the apex of the structure where line (9) enters will be near the lower apex of the pyramidal structure (26).

When transporting the subsea structure in a buoyant state, the structure is simply towed to the desired site. Once the structure is at the launch site, air is released from outlet (7) and water is allowed to flow into outlet (10). Once outlet (8) is beneath water surface, then water is pumped or allowed to flow into the oil storage cavity. Air pressure and air volume is then adjusted in the bottom flotation chambers and the main cavity as the structure is lowered into place upon the floor of the water body. Air pressure and air volume adjustments are continuous as the structure is lowered to avoid overstressing the walls. Once the structure is in place on the ocean floor, the lower chambers, formerly flotation chambers, are filled with a heavier than water slurry such as sand such that the anti-buoyancy slurry counteracts the lighter than water crude stored in the structure.

In both the subsea storage area and the offshore platform, sacrificial anodes are required both inside and outside the structure to protect the steel. Oil coats the anodes and renders them ineffective if stationary. A flotation harness retained at the oil/water interface may be necessary. This harness would be attached to a wire rope which contains a series of spaced anodes. As the oil level changes in the storage facility, the anodes are brought into proper proximity to protect the structural steel.

Once the structure is enclosed, chemicals such as corrosion inhibitors, scale inhibitors, paraffin inhibitors, bactericides and the like can be injected as oil is withdrawn. Since the structure is enclosed, chemical treatment should prevent formation of bacterial pads.

Relocation of the structure simply involves reversal of the previous steps such that slurry is removed from the bottom tanks, air is injected into the bottom flotation chambers and the main storage cavity and the structure is moved to the new sight. Again, care must be taken not to overstress the walls.

Thus the present invention provides two unique structures for offshore use. One, an offshore platform structure, comprises two similar pyramid structures connected at one face to form a final structure arranged with vertically oriented apexes. Flotation means are connected at the mid section horizontal intersect points. Additional flotation can be used around the mid-section, or on the lower section. This platform is anchored to the sea floor as required, with flotation located well below the water surface and away from most wave affected zones. The water surface normally contacts the upper pyramid approximately mid-way. The facilities for equipment, housing and the like are located in a stacked deck arrangement surrounding or near the upper apex. The facility offers portability and adaptability to many water depths, including a modified form for very shallow water.

The second structure, an offshore oil storage facility, rests on the ocean floor. The outside shape is a tetrahedron while the superstructure consists of equal length members which contribute to economical construction. The unit is designed to be floated to location without a barge. The structure has a large pyramid-shaped oil storage cavity and several small pyramid-shaped chambers at the bottom which can serve either as flotation or anti-buoyancy chambers. The structure is equipped with means to inject or withdraw air, fluids or slurry as needed. Such an arrangement is also useful for increased storage/buoyancy in the lower section of the platforms.

While certain embodiments and details have been shown for the purpose of illustrating this invention, it will be apparent to those skilled in this art that various changes and modifications may be made herein without departing from the spirit or scope of the invention.

We claim:

1. An offshore support structure comprising
  (a) a substantially horizontal flotation adjustable section containing at least 3 flotation adjustable members, each of said members having means to adjust its buoyancy, wherein each of said members is connected at each end to other flotation adjustable members wherein each connection of members form an apex point,
  (b) at least 3 upper support members connected at the lower end thereof to the horizontal flotation adjustable section at the apex points thereof, wherein all upper support members substantially mutually join to form a common upper apex, wherein the geometric configuration of any 2 adjacent upper support members and the horizontal flotation adjustable center section forms an isosceles triangle, and (c) at least one substantially horizontal platform connected to and supported by said upper support members at a level above the water line.

2. A structure as described in claim 1 wherein the upper support members and the flotation adjustable section substantially form a tetrahedron.

3. A structure as described in claim 1 wherein, in addition, at least three lower support members are connected at the upper end thereof to and depend from the apexes of said flotation adjustable section to form a center section wherein said lower support members substantially mutually join at the lower end thereof to form a lower apex, wherein the geometric configuration of any two dependent lower support members and the flotation adjustable center section forms an isosceles triangle.

4. A structure as described in claim 3 wherein said flotation adjustable center section, upper support members and lower support members substantially form a hexahedron.

5. A structure as described in claim 3 wherein said lower support members and lower apex are flotation adjustable.

6. A structure as described in claim 4 wherein either or both of the upper and lower apex are flotation adjustable enclosures.

7. A structure as described in claim 6 wherein said supported horizontal platforms are both above and below said upper apex.

8. A structure as described in claim 7 wherein a substantially rigid jack leg extends downward from said lower apex, and wherein a weight adjustable, depth adjustable ballast is moveably affixed thereto.

9. A structure as described in claim 7 wherien said structure is anchored to the bed of a body of water.

10. A structure as described in claim 7 wherein said structure is tethered by at least one anchor line.

11. A structure as described in claim 2 wherein said center section contains multiple adjustable jack legs.

12. A structure as described in claim 4 wherein said members comprise hollow pipe.

13. A structure as described in claim 4 wherein said members comprise a multiplicity of braced parabolic arcs.

14. A structure as described in claim 13 wherein said parabolic arcs are formed of hollow pipe.

15. A structure as described in claim 12 when used for hydrocarbon production.

16. A structure as described in claim 7 wherein the tetrahedron formed by the lower members and the center section is internally braced by internally segmented tetrahedron and/or octahedron framework, and wherein said framework is at least partially compartmented to serve as ballast chambers, buoyancy chambers or storage compartments.

* * * * *